RADIAL FLOW GAS DYNAMIC LASER

BACKGROUND OF THE INVENTION

This invention relates to the laser art and, more particularly, to a gas dynamic laser.

Gas dynamic lasers which employ a unidirectional gas flow for power extraction, although somewhat recent in advent, are per se well known. Equally well known to persons of ordinary skill in the art is the fact that such lasers have an inherent and severe disadvantage, to wit: the formation of undesired shock planes (and the resultant disturbances) in the cavity which deleteriously affect the optical quality of the laser beam that is generated or is amplified. To reduce the severity of this problem, beam passes through the cavity are made which avoid the shocks. However, such preventative action materially reduces the spatial extraction of power, simply because most of the volume of the cavity is wasted. As a result, laser power is nevertheless lost.

My inventive gas dynamic laser eliminates the above-described inherently severe disadvantage, and also eliminates (or at least significantly minimizes) the power loss attributable to the shock-avoiding beam passes conventionally used to reduce the power loss. I do so by teaching an entirely new structure for a gas dynamic laser; and, therefore, I significantly advance the state-of-the-art.

SUMMARY OF THE INVENTION

This invention pertains to a novel gas dynamic laser.

An object of this invention is to teach a radically different gas dynamic laser which allows significantly greater beam extraction flexibility because of fewer shock wave disturbances.

Another object of this invention is to teach the use of a novel toroidal nozzle array to produce a radially-directed, cylindrical supersonic flow field.

Still another object of this invention is to teach a gas dynamic laser the power of which, and the flow rate of which, are independent od the dimension of the laser device, and instead the flow rate of which is proportional to the square of the radius of the nozzle array and/or is linearly related to the preselected height of the nozzle array stack.

These objects, and other equally important and related objects, of this invention will become readily apparent after a consideration of the description of the invention and reference to the drawings.

DESCRIPTION OF THE DRAWINGS

FIG. 2 is a side elevation view, in schematic form and in cross section, of the planar nozzle array, of the cavity, and of a portion of the housing of the typical prior art gas dynamic laser shown in FIG. 1, depicting the undesirable shock plane formation pattern which is invariably created in the cavity of such a prior art laser;

FIG. 3 is a perspective view, in simplified pictorial form, of a preferred embodiment of my novel toroidal nozzle stack (or array) component of my inventive gas dynamic laser;

FIG. 4 is a side elevation view, partially in schematic form and partially in cross section, of the preferred embodiment of my toroidal nozzle stack shown in FIG. showing showning greater detail, particularly as to the subsonic contour region, the throat, and the supersonic contour region of said toroidal nozzle stack (or array).

FIGS. 5 and 6 are, respectively, top plan and side elevation views, in detail, of a representative nozzle of the toroidal nozzle stack (or array) shown in FIGS. 3 and 4;

FIG. 7 is a cutaway view, in perspective and in simplified schematic form, of a preferred generic embodiment of my inventive radial (flow) gas dynamic laser;

FIG. 8 is a top plan view, in cross section and in simplified schematic form, of the preferred generic embodiment of my invention shown in FIG. 7;

FIG. 9 is a perspective view, in simplified pictorial form, of one variation of the preferred generic embodiment of my invention shown in FIGS. 7 and 8, in which said first variation my novel diffuser component has long vertical (i.e., linear shaped) vanes and resulting long vertical (i.e., linear shaped) throats;

FIG. 10 is a perspective view, in simplified schematic form, of another variation of the preferred embodiment of my invention shown in FIGS. 7 and 8, in which said second variation my novel diffuser component has ring-shaped vanes and resulting circular (i.e., annular) shaped throats; and, FIGS. 11 and 12 are, respectively, the top plan view and the side elevation view, in simplified form, of still another variation of the preferred embodiment of my invention, in which said third variation my novel diffuser component has both ring shaped and vertical (i.e., linear shaped) vanes, resulting in quadrangular shaped throats which may be, for example, rectangular, sqaure, or the like.

DESCRIPTION OF THE PRIOR ART AND OF THE PREFERRED EMBODIMENT

1. As to The Prior Art

Figure 1:
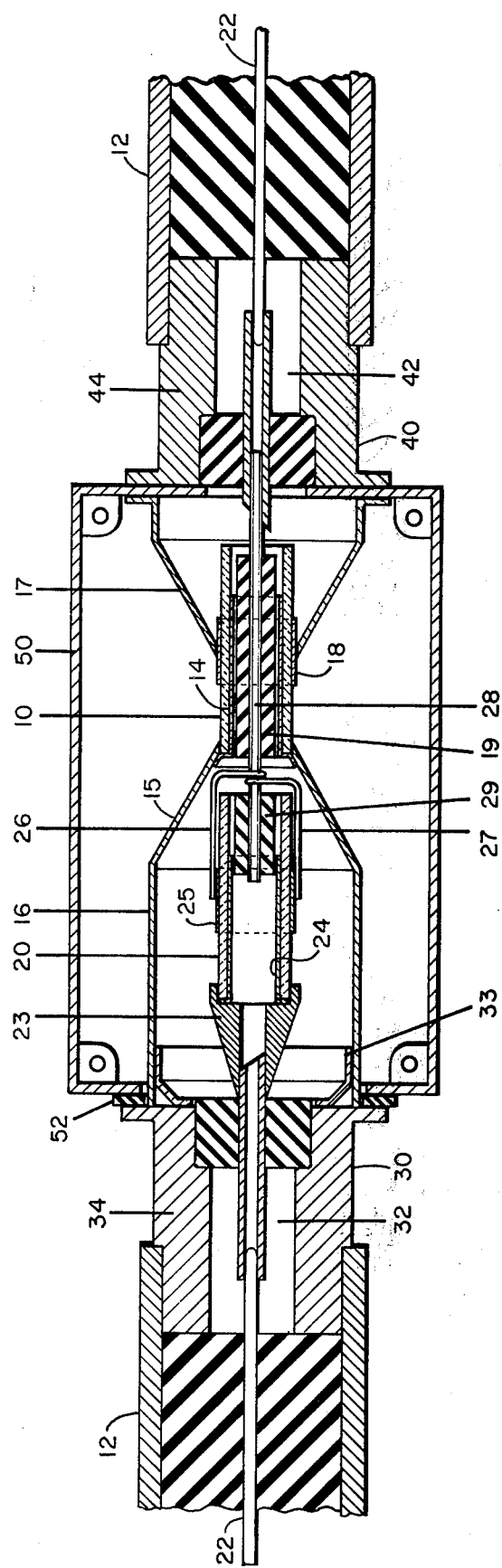
FIG. 1 is a perspective view, in schematic form and partially fragmented, of a typical prior art gas dynamic laser.

As a preliminary matter and in the interest of simplicity, the terminology "gas dynamic laser" will, when used herein, be abbreviated "GDL."

With reference to FIG. 1, therein is shown a typical state-of-the-art GDL. It is to be noted and to be remembered that the GDL 10 is assumed to be for use with a source of a gaseous medium (not shown) which is suitable for lasing. These prior art (i.e., conventional) GDLs, such as 10, include as essential components: a combustion chamber 11; a nozzle array 12 having a plurality of slit nozzles in the same plane, with the array downstream of the combustion chamber 11; a rectangular cavity 13, downstream of the nozzle array 12; a two-dimensional diffuser 14 (with vanes, such as 14A, 14B and 14C) downstream of the cavity 13; an exhaust 15 downstream of the two-dimensional diffuser 14; and, a housing 16 to contain the components of the GDL 10. Internal of the rectangular cavity 13 is an optical mirror system 17 with a plurality of mirrors, such as 17A and 17B, by which the created or amplified laser beam, such as 18, eventually is directed and is emitted from and out of the cavity 13 through a cavity opening, such as 13A.

To distinguish these "present day" state-of-the-art GDLs, such as 10, from my unique and novel GDL, I shall hereinafter refer to the former (i.e., the prior art ones) as the "unidirectional flow GDL" and/or more simply as the "unidirectional GDL," since use of any of said prior art GDL always results in a unidirectional supersonic flow (of the gaseous medium used for lasing)

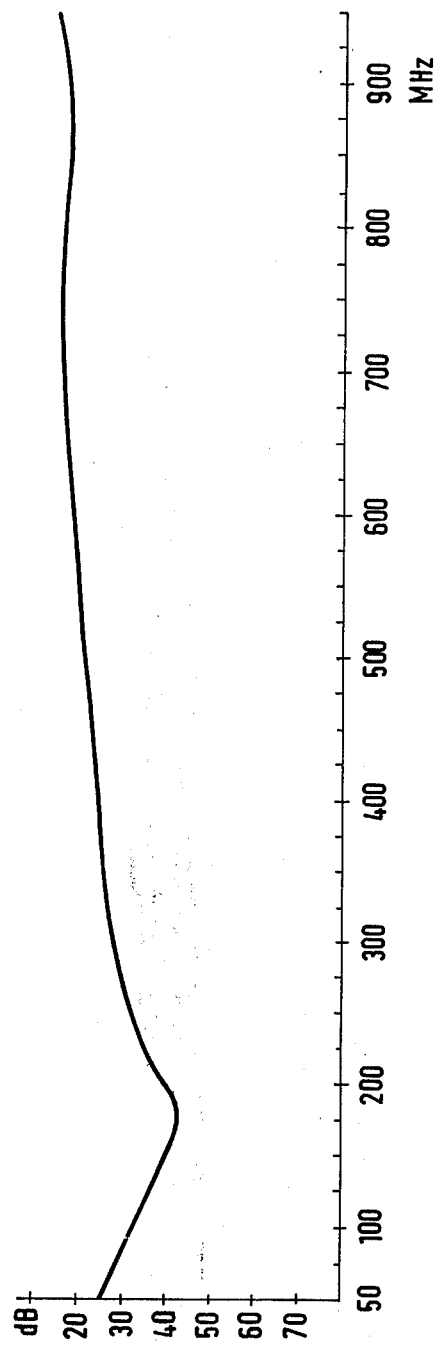

GALVANIC ISOLATOR FOR A FREQUENCY RANGE OF 40 TO 900 MHZ

This galvanic isolator is for a frequency range of 40 to 900 MHz (megacycles or megahertz), particularly for central aerial installations.

BACKGROUND OF THE INVENTION

In order to avoid disturbance caused by power supply components, hum, and the like, the connection between a central aerial installation and each single communal aerial installation connected to it has to be galvanically isolated in both of the coaxial conductors before being connected to the amplifying device of the communal aerial installations. At the same time the aerial has to be galvanically isolated from the other devices.

The reflection loss, for example, with respect to 75 $\Omega$ produced by a galvanic isolator as a function of the frequency in the frequency range of 40 to 900 MHz, has to be in the order of 26 dB at 40 MHz and decrease by 2dB/octave as the frequency increases. At the same time the galvanic isolator has to be sufficiently radiation-free, and has to meet the international requirements regarding disruptive strength (IEC, International Electrotechnical Commission publication 65).

When constructing a central aerial installation, the problem arises that up to now an isolator meeting the above requirements has not been available. In view of the present-day rapid growth of central aerial installations, galvanic isolators have become urgently needed.

SUMMARY OF THE INVENTION

This invention provides a simple coaxial galvanic isolator, which meets these requirements. This result has been gained, by means of constructing two substantially identical tubular capacitors, which are axially spaced and in line with each other and form part of a coaxial transmission line or conductor. These separators are arranged in such a way that one of them is connected to the inner conductor and the other is connected to the outer conductor of the coaxial line. Thus the inner conductor extends through the second capacitor, for the outer conductor which narrows conically between the two capacitors to the diameter of the second capacitor and then widens conically after the second capacitor. The connection between the inner conductor of the coaxial line and the outer coating of the first capacitor is preferably formed by two diametrically arranged wires, and to the inner coating by a conical conductor.

Moreover, the said construction also secures a continuous transition for the high frequency current transmitted, so that points of reflection are avoided. The characteristic impedance is derived from the values of the specific inductance and capacitance.

The connection between the inner conductor of the coaxial line and the outer coating of the first capacitor is preferably formed by two diametrically arranged wires.

BRIEF DESCRIPTION OF THE VIEWS

The above mentioned and other features, objects and advantages, and the manner of attaining them are described more specifically below by reference to an embodiment of this invention shown in the accompanying drawings, wherein:

FIG. 1 shows a longitudinal section of an isolator according to a preferred embodiment of this invention, and FIG. 2 is a graph of the reflection loss characteristic in decibals (dB) shown for the isolator of FIG. 1 for the frequency range of 50 to 900 MHz.

DETAILED DESCRIPTION OF A PREFERRED EMBODIMENT

Referring to FIG. 1, there is shown an isolator according to this invention connected between two adjacent ends of a coaxial transmission line. Inside this isolator is a tubular ceramic capacitor 10 connected to and between the adjacent ends of the outer conductor 12 of the coaxial transmission line, and a substantially identical tubular ceramic capacitor 20 connected to and between the adjacent ends of the inner conductor 22 of that coaxial line. The inner coating 14 of capacitor 10 is connected to a tube 16 via a conductive conical section 15, and the outer coating 18 of the capacitor 10 is connected to a conducting conical section 17. Each of these conical sections 15 and 17 are connected to the adjacent ends of the outer conductor 12 of the coaxial transmission line. The inner coating 24 of the capacitor 20 is connected to a conducting cone 23, and the outer coating 25 of the capacitor 20 is electrically connected to an extension 28 of the inner conductor 22 of one of the two ends of the coaxial transmission line by means of two diametrically arranged wires 26 and 27. The extension 28 of the inner conductor 22 passes through the center of the tubular capacitor 10.

The cone 23 is connected to the bushing 32 of the plug 30 at one end of the isolator, which bushing 32 connects with the central conductor 22 of one of the adjacent ends of the coaxial cable. The central conductor 28 is connected to the bushing 42 of the plug 40 at the other end of the isolator connected to the other adjacent end of the inner conductor 22 of the coaxial cable.

By means of a collar 33, the conductor tube 16 is connected to the sleeve 34 of the plug 30, which in turn is connected to the outer conductor 12 of the coaxial cable at one adjacent end thereof. The cone 17 is connected to the sleeve 44 of the plug 40 which is connected to the outer conductor 12 of the other adjacent end of the coaxial transmission line.

Inside of the capacitors 10 and 20, the central conductor or wire 28 is surrounded by insulating material 19 and 29, respectively.

The above mentioned parts of this isolator may then be placed in a case 50 to which the sleeves 44 and 34 are affixed, with the sleeve 34 being insulated therefrom by a non-conductive washer 52.

The characteristic impedance of the galvanic isolator is partly determined by this hollow cylinder case 50 functioning as an outer conductor, in which the air serves as the dielectric, and the isolating capacitor 20 functions as an inner conductor. In this construction the diameters of the two conductors 20 and 50 are in the ratio of 1 to 3.

The calculated impedance of the isolator shown in FIG. 1 amounts to about 66 $\Omega$. The average measured value of the reflection loss in the frequency range of 40 to 900 MHz amounts to about 25dB (see FIG. 2), which corresponds to a degree of match $m = 0.896$. Then the average characteristic impedance amounts to $Z_o = 0.896 \times 75 \, \Omega = 67.2 \, \Omega$. The transmission loss in the said frequency range amounts to less than 1 dB, and when using the isolator for blocking the 50 Hz supply voltage, the blocking reactance is 4,5 MΩ. Thus the reflection loss characteristic, which can be called very favourable, which shows the transmission loss in the frequency range of 50 to 900 MHz is very constant, and without the plugs 30 and 40 less than 1 dB.

While there is described above the principles of this invention in connection with specific apparatus, it is to be clearly understood that this description is made only by way of example and not as a limitation to the scope of this invention.

What is claimed is:

1. A galvanic isolator for a coaxial transmission line for a frequency range of 40 to 900 MHz, comprising: two tubular capacitors, which are axially in line with each other and form part of said coaxial line, one of the capacitors being connected to the inner conductor of the coaxial line, which inner conductor extends through the other capacitor, and the other of said capacitors being connected to the outer conductor of the coaxial line, the connection to the other capacitor comprising conductor cones that taper inwardly from the spaced ends of the outer conductor.

2. A galvanic isolator according to claim 1, wherein one capacitor has an outer coating, and wherein the connection between the inner conductor of the coaxial line and the outer coating of said one capacitor comprises a diametrical wire.

3. A galvanic isolator for frequencies between about 40 and 900 megacycles and for connecting adjacent spaced ends of a coaxial transmission line having inner and outer concentric conductors, said isolator comprising:

a. two substantially equal sized tubular capacitors having inner and outer conductive surfaces and being axially spaced and located concentrically between said inner and outer conductors, b. one of said capacitors bridging the spaced ends of said inner conductor and having its inner and outer conductive surfaces respectively connected to the spaced ends of said inner conductor, and c. the other of said capacitors bridging the spaced ends of said outer conductor of said line and having its inner and outer conductive surfaces respectively connected by conical conductors to the spaced ends of said outer conductor.

4. A galvanic isolator according to claim 3 wherein said one capacitor has its inner conductive surface connected to one end of said inner conductor by means of a conical conductor.

5. A galvanic isolator according to claim 3 wherein said one capacitor has its outer conductive surface connected to one end of said inner conductor by means of a diametrical wire.

6. A galvanic isolator according to claim 3 wherein said connections and capacitors are surrounded by a chamber electrically connected to one of said spaced ends of said outer conductor and insulated from the other spaced end of said outer conductor of said coaxial transmission line.

* * * * *